United States Patent [19]

Fukuda

[11] 4,122,997
[45] Oct. 31, 1978

[54] OPTICAL READER

[75] Inventor: Mitsuhisa Fukuda, Tokyo, Japan

[73] Assignee: Ricoh Company, Ltd., Tokyo, Japan

[21] Appl. No.: 766,152

[22] Filed: Feb. 7, 1977

[30] Foreign Application Priority Data

Feb. 6, 1976 [JP] Japan ................... 51-11977

[51] Int. Cl.² .................... G06K 7/10; G08C 9/06
[52] U.S. Cl. .................................. 235/455; 250/569
[58] Field of Search ............... 235/61.11 E, 454, 455; 340/146.3 F, 146.3 AC; 250/566, 568, 569, 555

[56] References Cited

U.S. PATENT DOCUMENTS

| | | | |
|---|---|---|---|
| 3,566,083 | 2/1971 | McMillin | 235/61.11 E |
| 3,671,722 | 6/1972 | Christie | 235/61.11 E |
| 3,737,629 | 6/1973 | See | 235/61.11 E |
| 3,763,352 | 10/1973 | Del Rio et al. | 235/61.11 E |
| 3,985,999 | 10/1976 | Yoneyama | 235/61.11 E |

Primary Examiner—Daryl W. Cook
Attorney, Agent, or Firm—Frank J. Jordan

[57] ABSTRACT

A bundle of illuminating optical fibers conveys light from a light source to an area on a document in which a mark may be present or absent. A bundle of reading optical fibers conveys light reflected from the area to a light sensor. The amount of conveyed light is less when the mark is present than when the mark is absent so that the light sensor may determine whether the mark is present. The optical axes of the optical fibers are perpendicular to the document at the ends thereof facing the document. The width of the reading optical fiber bundle and the distance of the reading optical fiber bundle from the illuminating optical fiber bundle are selected to provide maximum contrast between marks and the background of the document so that glossy marks made by pencil as well as non-glossy marks made by felt-tip pen or the like can be reliably read.

14 Claims, 16 Drawing Figures

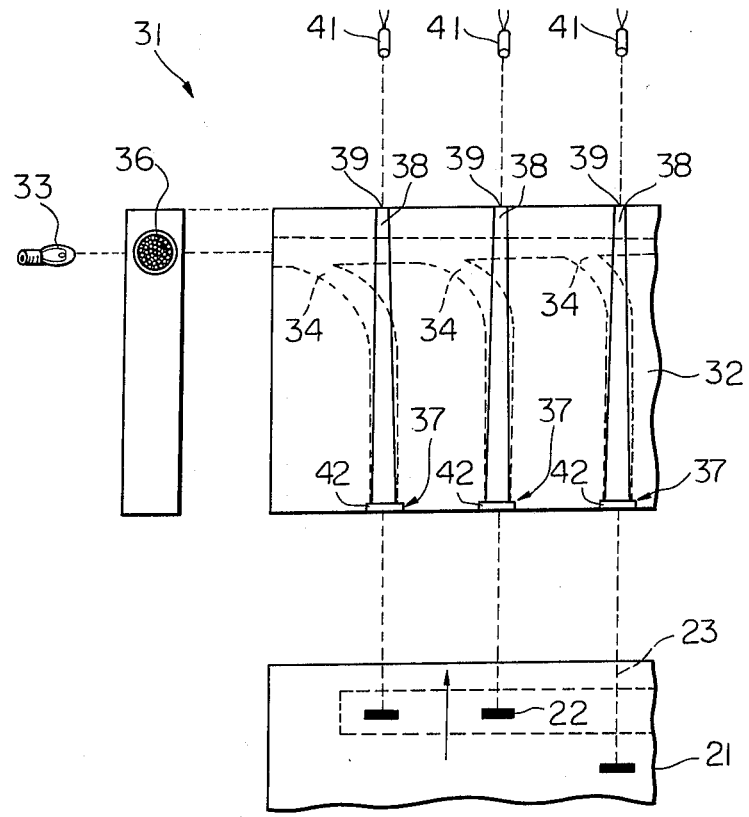
Fig. 9
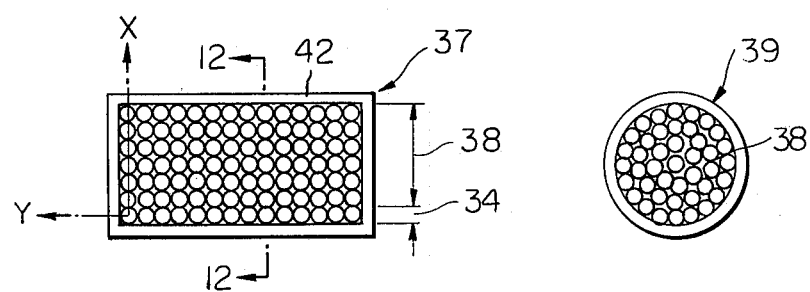
Fig. 11 PRIOR ART
Fig. 10

OPTICAL READER

BACKGROUND OF THE INVENTION

The present invention relates to an optical reader comprising optical fiber bundles.

Optical readers comprising optical fibers are becoming increasingly popular in the art. These readers detect the presence or absence of a mark in a predetermined area of a document in sheet form and are used in facsimile systems, card processors, etc. More specifically, light is conveyed from a light source to the area on the sheet by means of one or more illuminating optical fibers. Light reflected from the area is conveyed to a light sensor such as a photosensitive diode or transistor through one or more reading optical fibers. The ends of the fibers facing the sheet are placed in close proximity.

When a mark is present in the area, the amount of light which reaches the light sensor is less than when the mark is not present so that the light sensor detects the presence or absence of the mark in the form of two discrete light levels respectively.

Whereas these prior art optical readers are generally capable of reliably detecting marks made by a non-glossy writing means such as a felt-tip pen, erroneous readings often occur when the marks are made by a glossy marking means such as a pencil. Depending on the angles of orientation of the ends of the optical fibers, more light might actually be conveyed to the light sensor from the glossy surface of a pencil mark than from the white background of the sheet. Although considereble experimentation has been performed especially regarding the orientation of the ends of the optical fibers, there has not been achieved heretofore an optical reader utilizing optical fibers which can detect the presence of marks made by both non-glossy and glossy marking means with complete reliability.

SUMMARY OF THE INVENTION

In accordance with the present invention, a bundle of illuminating optical fibers conveys light from a light source to an area on a document in the form of a sheet in which a mark may be present or absent. A bundle of reading optical fibers conveys light reflected from the area to a light sensor such as a photosensitive diode or transistor. The amount of light conveyed to the light sensor is less when the mark is present than when the mark is absent so that the light sensor may determine whether the mark is present or absent. The optical axes of the optical fibers are perpendicular to the document at the ends of the optical fibers facing the document. The width of the reading optical fiber bundle and the distance of the reading optical fiber bundle from the illuminating optical fiber bundle are selected to provide maximum contrast between marks and the background of the document so that glossy marks made by pencil as well as non-glossy marks made by felt-tip pen or the like can be reliably read.

It is an object of the present invention to provide an optical reader which is capable of reliably detecting the presence of marks on a document regardless of whether the marks are made by a glossy means such as a pencil or by a non-glossy means such as a felt-tip pen.

It is another object of the present invention to provide an optical reader comprising bundles of optical fibers which is effective and reliable in operation but may be constructed in a simplified and inexpensive manner utilizing standard techniques.

It is another object of the present invention to provide a generally improved optical reader.

Other objects, together with the foregoing, are attained in the embodiments described in the following description and illustrated in the accompanying drawing.

BRIEF DESCRIPTION OF THE DRAWING

FIG. 9 is an exploded diagrammatic view illustrating the arrangement of an optical reader embodying the present invention;

FIG. 10 is an overhead plan view of the light transmitting end of a reading optical fiber bundle of the reader shown in FIG. 11;

FIG. 11 is a plan view from below illustrating the arrangement of adjacent ends of the reading optical fiber bundle and an illuminating optical fiber bundle as provided in the prior art;

DESCRIPTION OF THE PREFERRED EMBODIMENTS

While the optical reader of the invention is susceptible of numerous physical embodiments, depending upon the environment and requirements of use, substantial numbers of the herein shown and described embodiments have been made, tested and used, and all have performed in an eminently satisfactory manner.

Figure 1:
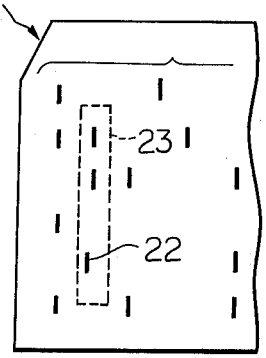
FIG. 1 is a partial illustration of a data card which constitutes a typical document for reading by the present apparatus.

Referring now to FIG. 1 of the drawing, data is entered onto a data card 21 in the form of marks 22 arranged in columns 23. For simplicity of illustration only one mark 22 and one column 23 are labeled in the drawing. The marks are made by a pencil, felt-tip pen or the like and may represent any form of data which can be encoded in the illustrated format.

Figure 2:
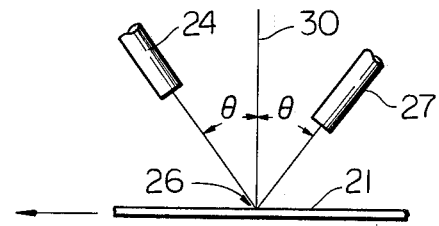
FIG. 2 is a diagrammatic view showing a prior art apparatus for reading the card.

FIG. 2 illustrates the principle used in the prior art for detecting whether a mark 22 is present or absent in a particular area of the card 21. More specifically, an illuminating optical fiber 24 conveys light from a suitable light source such as a lamp (not shown) onto an area 26 of the card 21 on which a mark 22 may or not be formed. A reading optical fiber 27 conveys light from the area 26 to a light sensor such as a photosensitive diode or transistor (not shown). In the particular arrangement shown, the optical axes of the optical fibers 24 and 27 each define an angle θ with the normal 30 to the surface of the card 21 so that the angle of incidence of the light on the card 21 from the optical fiber 24 equals the angle of reflection of the light from the card 21 to the optical fiber 27. A set of optical fibers 24 and 27 is provided for each row of marks 22 on the card 21 and the card 21 is moved leftwardly as indicated by an arrow in FIG. 2 to sequentially read the marks 22 in the respective rows.

Figure 3:
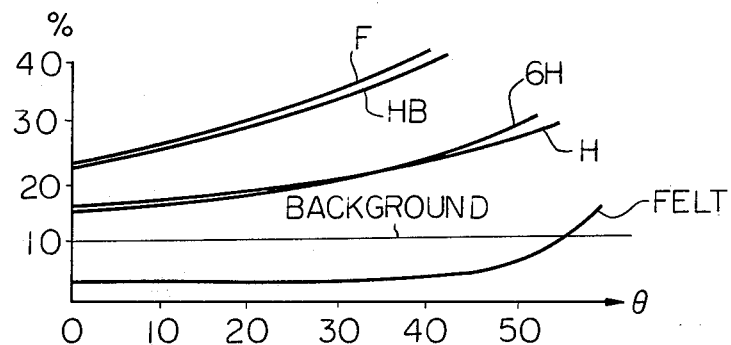
FIG. 3 is a graph illustrating the performance of the apparatus shown in FIG. 2.

FIG. 3 illustrates the performance of the arrangement of FIG. 2, in which the abscissa represents the angle θ and the ordinate represents the relative amount of light conveyed by the reading optical fiber 27 to the light sensor. The six curves represent the amount of light for the white background of the card 21, a mark 22 made by a felt-tip pen and marks 22 made by pencils of hardness grades F, HB, 6H and H respectively.

It will be seen that the amount of light for a mark 22 made by a felt-tip pen is less than the amount of light for the background until the angle θ well exceeds 50°. However, the amount of light for marks 22 made by all of the grades of pencils is always greater than the light for the background. This is because the pencil marks 22 are glossy and reflect more light than the background of the card 21.

The arrangement of FIG. 2 can reliably read marks 22 made by felt-tip pencils. Since the amount of light for a felt-tip pencil is less than the background, the light sensor can detect the presence or absence of marks 22 by means of the amount of light conveyed thereto by the reading optical fiber 27. However, erroneous readings will occur if the marks 22 are made by pencil since the amount of light is greater than that of the background. Although pencil marks may be read if the quantization level of the light sensor is adjusted, the apparatus so adjusted will not read marks 22 made by felt-tip pens.

Figure 4:
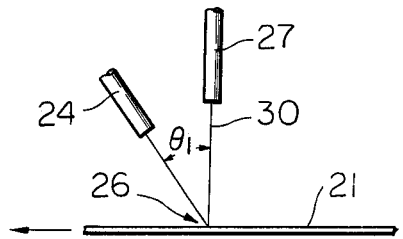
FIG. 4 is similar to FIG. 2 but shows another prior art apparatus.

FIG. 4 illustrates how the performance of the arrangement may be improved by changing the angles of the optical fibers 24 and 27 relative to the card 21. More specifically, the reading optical fiber 27 is oriented perpendicular to the card 21 and the illuminating optical fiber 24 is oriented at an angle $\theta_1$. The reading optical fiber 27 is disposed directly above the illuminated area 26.

Figure 5:
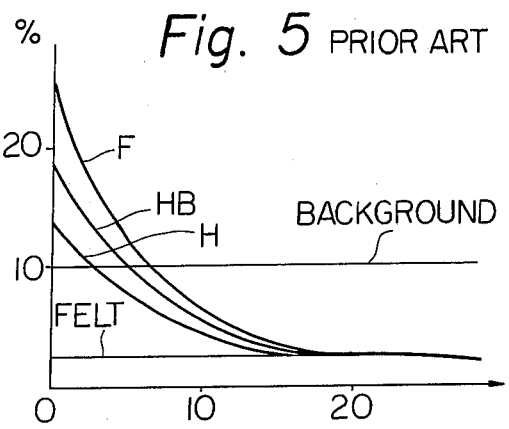
FIG. 5 is similar to FIG. 3 but shows the performance of the apparatus shown in FIG. 4.

FIG. 5 shows the performance of the arrangement of FIG. 4, which is improved since marks 22 made by both felt-tip pens and pencils can be read where the angle $\theta_1$ is greater than 10°.

Figure 6:
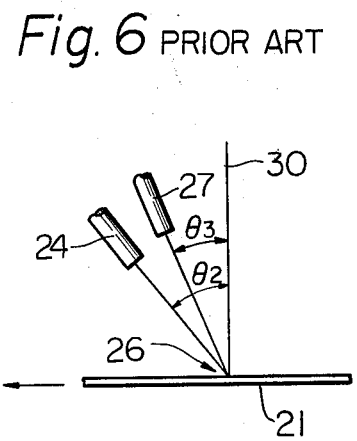
FIG. 6 shows yet another prior art apparatus.
Figure 7:
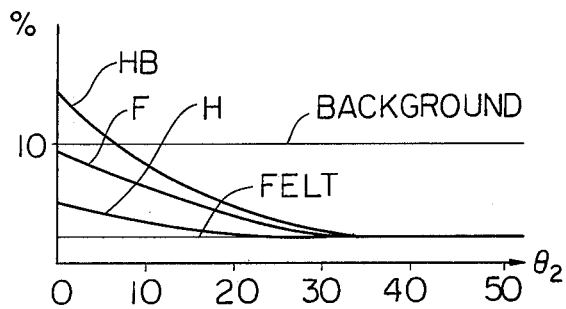
FIG. 7 shows the performance of the apparatus shown in FIG. 6.

FIGS. 6 and 7 show how the performance can be further improved by orienting the optical fibers 24 and 27 at angles $\theta_2$ and $\theta_3$ respectively to the normal 30 to the surface of the card 21. FIG. 4 illustrates a case in which the angle $\theta_3$ is fixed and the angle $\theta_2$ is varied.

Figure 8:
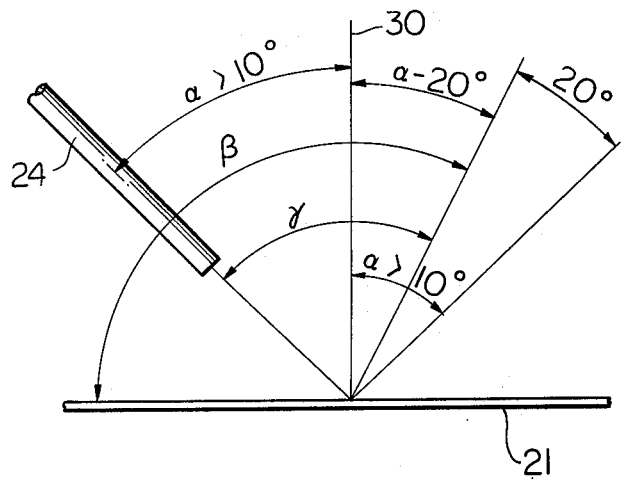
FIG. 8 is a diagrammatic view illustrating the angular range of orientation of optical fibers in the prior art appartus.

FIG. 8 illustrates the results of experimentation with the angles of orientation of the optical fibers 24 and 27 in general form. In order for light reflected from both felt-tip pen and pencil marks 22 to be less than the light reflected from the background of the card 21, the illuminating optical fiber 24 should be oriented at an angle α with respect to the normal 30 to the card 21 which is greater than 10°. The reading optical fiber 27 should be oriented within an angular range β which extends up to 20° on the opposite side of the normal 30. Preferably, the reading optical fiber 27 will be positioned within an angular range γ so as to be between the illuminating optical fiber 24 and 20° on the opposite side of the normal 30.

Although the angular relationships between illuminating and reading optical fibers described heretofore will allow detecting marks made by both glossy and non-glossy marking means, they are difficult to embody in a card reader in which a great number of marks are provided in close proximity and especially in a facsimile reader in which small closely adjacent areas must be read due to the close packing of the optical fibers. The manufacturing operations necessary to provide the angular relationships required are intricate and costly which make the price of the apparatus prohibitively high for many small scale installations.

It has been proposed heretofore to construct an optical reader 31 shown in FIG. 9 in which the axes of the optical fibers at the ends thereof facing the card 21 are oriented perpendicular to the surface of the card 21. This arrangement makes it relatively easy to embody the optical reader 31 since the ends of the optical fibers may be bundled together.

More specifically, the optical reader 31 comprises a block or substrate 32 which serves as a support. Whereas the card 21 is moved into the plane of the drawing for scanning as viewed in FIG. 9, a light source in the form of a lamp 33 as provided to the left end of the block 32. An illuminating optical fiber bundle 34 comprising 14 optical fibers is provided for each row of the card 21 in a position corresponding to the marks 22. The upper ends of all of the illuminating optical fibers 34 are bundled together in a mass at the left end of the block 32 adjacent to the lamp 33 as indicated at 36. The lower ends of the illuminating optical fibers 34 are disposed adjacent to the areas of the card 21 on which the marks 22 may be formed as designated at 37.

A reading optical fiber bundle 38 comprising 84 optical fibers is provided for each illuminating optical fiber bundle 34. The lower ends of the reading optical fiber bundles 38 are bundled together with the respective illuminating optical fiber bundles 34 at 37 and the upper ends of the reading optical fiber bundles 38 open through the top of the block 32 as indicated at 39. FIG. 10 illustrates the appearance of the upper end of a typical reading optical fiber bundle 38 as viewed from above at 39. Light sensors 41 are provided at the upper ends of the reading optical fiber bundles 38 respectively. The light sensors 41 may be conveniently constituted by a number of components currently available on the open market such as photosensitive diodes, transistors and the like.

FIG. 11 illustrates the appearance of the lower end of a typical illuminating optical fiber bundle 34 and the respective reading optical fiber bundle 38 as viewed from below at 37. The numeral 42 designates protective glass windows provided at 37. To facilate the description, rectangular coordinates x and y are defined at 37 which are both parallel to the surface of the card 21. The card 21 is preferably moved in the −x direction for scanning but may also be moved in the +x direction. The lower or light transmitting ends of the optical fibers of the illuminating optical fiber bundle 34 are arranged in abutting engagement with each other in a straight line in the y direction. The lower or light receiving ends of the optical fibers of the reading optical fiber bundle 38 are arranged also in abutting engagement in the form of 14 rows in the y direction and 6 rows in the x direction.

Figure 12:
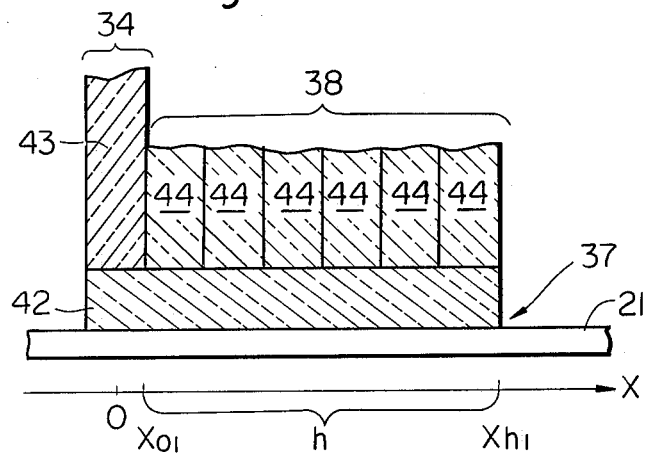
FIG. 12 is a section taken on a line 12—12 of FIG. 11.

This arrangement is shown in enlarged scale in FIG. 12 in which the individual optical fibers of the illuminating optical fiber bundle 34 are designated as 43 and the individual optical fibers of the reading optical fiber bundle 38 are designated as 44. The axes of all of the optical fibers 43 and 44 at their lower ends are perpendiculr to the sheet or card 21.

In FIG. 12, the center of illumination of the area of the card 21 illuminated by the optical fiber 43 corresponds to $x=0$, which is also the position of the axis of the illuminating optical fiber 43 in the $x$ direction. The wall of the leftmost optical fiber 44 abutting against the optical fiber 43 is positioned at $x_{01}$ which is equal to one-half the diameter of the optical fiber 43, and constitutes the portion of the reading optical fiber bundle 38 closest to the illuminating optical fiber bundle 34. The rightmost wall of the rightmost optical fiber 44 is positioned at $x_{h1}$. The width of the reading optical fiber bundle 38 in the $x$ direction is equal to $h = x_{h1} - x_{01}$ and has a value equal to the diameter of any of the optical fibers 44 (assuming that the optical fibers 44 are identical) multiplied by the number of optical fibers 44 in the $x$ direction.

The optical reader 31 operates in a manner similar to that described above. Light from the lamp 33 is conveyed by the illuminating optical fiber bundles 34 to illuminate the respective areas on the card 21. The light reflected from these areas is conveyed by the reading optical fiber bundles 38 to the light sensors 41 which detect the presence or absence of marks 22 in the respective areas by the amount of light conveyed through the reading optical fiber bundles 38.

Figure 13:
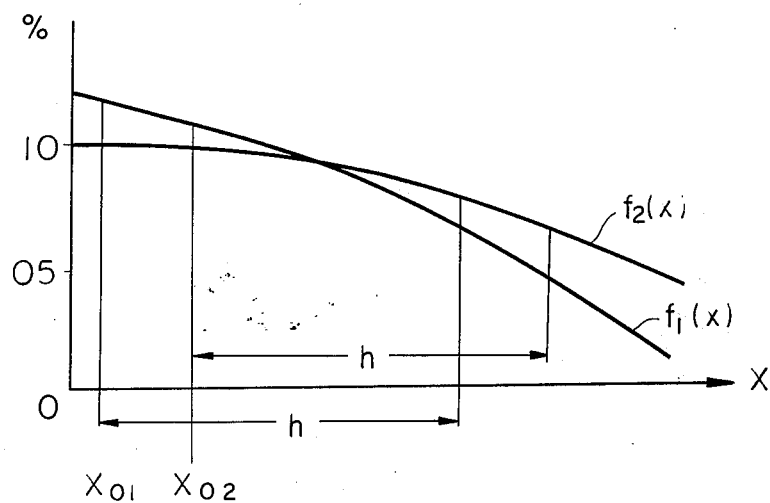
FIG. 13 is a graph illustrating the performance of the arrangement of FIG. 11.

In FIG. 13 a curve $f_1(x)$ represents the relative intensity of light conveyed to the light sensor 41 as a function of displacement in the $x$ direction where a mark 22 made by a pencil is present. A curve $f_2(x)$ similarly represents the light intensity when a mark 22 is not present. The total amount of light $k_1$ conveyed to the light sensor 41 when a mark 22 is present is equal to $$k_1 = \int_a^b \int_{x_0}^{x_0+h} f_1(x) d_x d_y \quad (1)$$

where $x_0$ is the distance from the center of illumination of the area to the nearest portion of the reading optical fiber bundle 38 and has the value $x_0 = x_{01}$ in the embodiment of FIGS. 11 and 12. The width of the reading optical fiber bundle 38 in the $y$ direction is equal to $b-a$. The second integration (with respect to $y$) is equivalent to multiplication by a constant.

In an essentially similar manner, the total amount of light $k_2$ conveyed to the light sensor 41 when a mark 22 is not present is equal to $$k_2 = \int_a^b \int_{x_0}^{x_0+h} f_2(x) d_x d_y \quad (2)$$

In this case, the integration with respect to $y$ is equivalent to multiplication by the same constant as in equation (1). The ratio $k$ of the amount of light conveyed to the light sensor 41 when mark 22 is present to the amount of light conveyed to the light sensor 41 when a mark 22 is not present is therefore equal to $$k = \frac{k_1}{k_2} = \frac{\int_{x_0}^{x_0+h} f_1(x) d_x}{\int_{x_0}^{x_0+h} f_2(x) d_x} \quad (3)$$

In order for the optical reader 31 to reliably detect a mark 22 the ratio $k$ must be small enough that there is enough contrast or difference in the amounts of light conveyed to the light sensor 41 when the mark 22 is present or absent respectively.

Where $x_0 = x_{01}$ in the prior art embodiment of FIGS. 11 and 12, $k_1$ is represented by the area under the curve $f_1(x)$ between $x_{01}$ and $x_{01}+h$ and $k_2$ is represented by the area under the curve $f_2(x)$ between the same limits. An inspection of FIG. 13 will disclose that these areas are almost equal. For this reason, the prior art arrangement of FIGS. 11 and 12 is not capable of reliably detecting marks 22 made with pencil.

This problem is overcome in accordance with the present invention by increasing the value of $x_0$ to $x_{02}$. As can be seen in FIG. 13 where $k_1$ is represented by the area under the curve $f_1(x)$ between $x_{02}$ and $x_{02}+h$ and $k_2$ is represented by the area under the curve $f_2(x)$ between the same limits, $k_2$ is quite substantially larger than $k_1$ and $k$ is reduced well below 1.0. This makes it possible to reliably detect marks 22 made by pencil.

Figure 14:
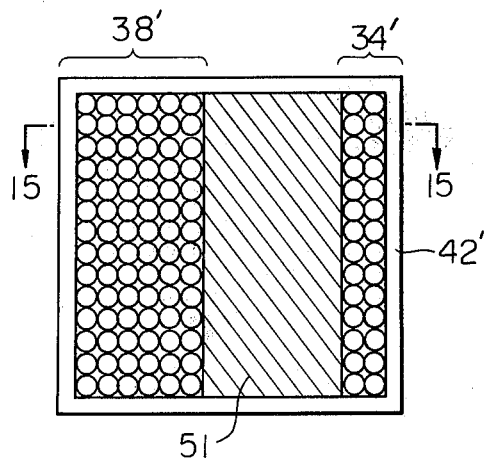
FIG. 14 is similar to FIG. 11 but shows an arrangement embodying the present invention.
Figure 15:
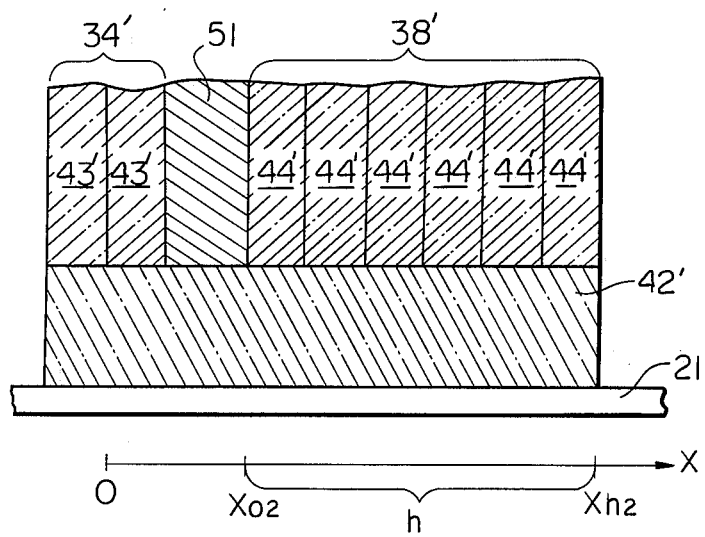
FIG. 15 is a section taken on a line 15—15 of FIG. 14.

In FIGS. 14 and 15 which illustrate a preferred embodiment of the present invention like elements are designated by the same reference numerals primed. Whereas a reading optical fiber bundle 38' is substantially identical to the bundle 38, an illuminating optical fiber bundle 34' comprises two rows of 14 optical fibers. In this case, $x=0$ corresponds to the interface of the two optical fibers of the illuminating optical fiber bundle 34'. The individual optical fibers of the optical fiber bundles 34' and 38' are designated as 43' and 44' respectively. A spacer 51 is attached between the optical fiber bundles 34' and 38' so that the leftmost wall of the leftmost optical fiber 44' as viewed in FIG. 15 is spaced at $x_{02}$. The rightmost portion of the optical fiber bundle 38' is spaced at $x_{h2}$ and the width $h$ is the same as in the prior art embodiment.

In a practical arrangement, each of the optical fibers 43' and 44' are 0.05mm in diameter which makes $h = 0.3$mm, $x_{02} = 0.35$mm whereby the spacer 51 must be 0.3mm wide. This embodiment produces a value of $k \simeq 0.8$ which can be considered as an optimum value since it provides reliable mark detection and a further increase in $x_{02}$ would result in $k_1$ and $k_2$ becoming too small for reliable operation of practical light sensors.

Figure 16:
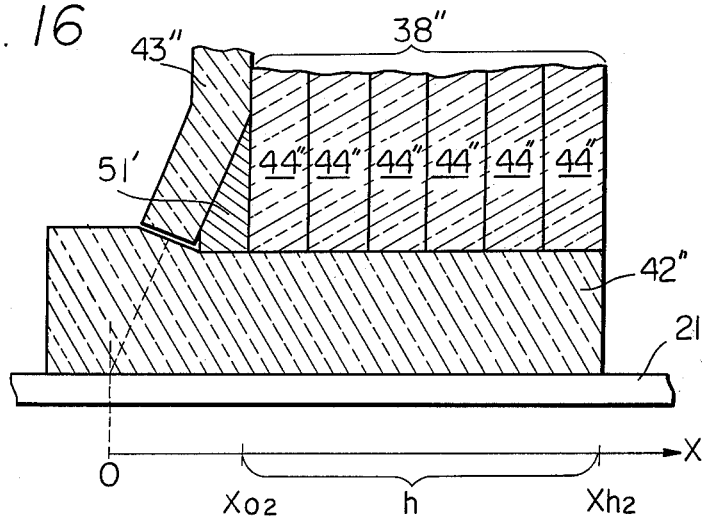
FIG. 16 is similar to FIG. 15 but shows a modified embodiment.

A modification of the invention is shown in FIG. 16 in which the spacer 51 is replaced by a wedge shaped spacer 51'. Like elements are designated by the same reference numerals double primed. The spacer 51' aims the light from the illuminating optical fiber 43'' away from reading optical fiber bundle 38'' in such a manner as to provide the same distance $x_0 = x_{02}$ between the center of illumination and the reading optical fiber bundle 38''. In this embodiment, only one row of illuminating optical fibers 43'' is provided.

In summary, the present invention provides an optical reader which can reliably read marks on a sheet regardless of whether the marks were made by a nonglossy means such as a felt-tip pen or by a glossy means such as a pencil. In addition, the present optical reader may be manufactured at low cost on a commercial production basis, thereby providing high performance and substantial economies. Many modifications will become possible for those skilled in the art after receiving the teachings of the present disclosure without departing from the scope thereof.

What is claimed is:

1. An optical reader for sensing the presence and absence of a mark in an area of a sheet comprising:
   illuminating optical fiber means for conveying light to illuminate said area;
   light sensor means; and
   reading optical fiber means for conveying light reflected from said area to the light sensor means, a width of the reading optical fiber means in a direction parallel to the sheet and a distance of a light receiving end of the reading optical fiber means in said direction from a center of illumination of said area being selected so that a ratio of an amount of light conveyed to the light sensor means when the mark is absent to an amount of light conveyed to the light sensor means when the mark is present is a predetermined optimum value.

2. An optical reader as in claim 1, in which the optical axis of the reading optical fiber means is oriented perpendicular to the sheet at the light receiving end of the reading optical fiber means.

3. An optical reader as in claim 1, in which the reading optical fiber means comprises a bundle of optical fibers.

4. An optical reader as in claim 1, further comprising a spacer attached between the illuminating optical fiber means and the reading optical fiber means.

5. An optical reader as in claim 1, in which the ratio $$\frac{\int_{x_0}^{x_0 + 1} f_1(x)dx}{\int_{x_0}^{x_0 + h} f_2(x)dx} = k$$

where $k$ is the predetermined optimum value;
$x$ is the displacement from the center of illumination of said area;
$x_0$ is the distance from the center of illumination of said area to the nearest portion of the reading optical fiber means in said direction;
$h$ is the width of the reading optical fiber means in said direction;

$f_1(x)$ is the intensity of light conveyed to the light sensor means as a function of $x$ when the mark is present in said area; and
$f_2(x)$ is the intensity of light conveyed to the light sensor means as a function of $x$ when the mark is absent from said area.

6. An optical reader as in claim 5, in which the illuminating optical fiber means comprises two optical fibers each being 0.05mm in diameter abuttingly spaced in said direction, the reading optical fiber means comprises six optical fibers each being 0.05mm in diameter abuttingly spaced in said direction, $x_0 = 0.35$mm and $h = 0.3$mm.

7. An optical reader as in claim 6, in which the optical axes of the optical fibers of the reading optical fiber means are oriented perpendicular to the sheet at the light receiving ends thereof.

8. An optical reader as in claim 7, in which the optical axes of the optical fibers of the illuminating optical fiber means are oriented perpendicular to the sheet at the ends thereof facing the sheet.

9. An optical reader as in claim 5, in which $k$ is less than 0.8.

10. An optical reader as in claim 1, wherein said predetermined optimum value provides maximum contrast between the marks and the background of the document so that glossy marks made by a pencil and non-glossy marks made by a felt-tip pen or the like can be readily detected.

11. A method of detecting the presence or absence of a mark in a predetermined area of a document in the form of a sheet comprising conveying light along a bundle of illuminating optical fibers from a light source to the area at which a mark may be present or absent, conveying light reflected from the area along a bundle of reading optical fibers to a light sensor, sensing the reflected and conveyed light by said light sensor, and selecting the width of the bundle of reading optical fibers and the distance of the bundle of reading optical fibers from the bundle of illuminating optical fibers to provide maximum contrast between the marks and the background of the document so that glossy marks made by a pencil and non-glossy marks made by a felt-tip pen or the like can be readily detected by said light sensor.

12. The method according to claim 11 comprising spacing the bundle of reading optical fibers from the bundle of illuminating optical fibers.

13. The method according to claim 11 comprising disposing the axes of the light receiving ends of the reading optical fibers perpendicular to the document.

14. The method according to claim 11 comprising disposing the axes of the ends of the illuminating optical fibers facing the document perpendicular to the document.

* * * * *